United States Patent [19]

Takimoto et al.

[11] Patent Number: 4,492,982
[45] Date of Patent: Jan. 8, 1985

[54] VIDEO CAMERA IMAGE TUBE BURN-IN PREVENTION APPARATUS

[75] Inventors: Hiroyuki Takimoto, Yokohama; Takashi Kuniyoshi, Sagamihara; Tatsuzo Ushiro, Tokyo, all of Japan

[73] Assignee: Canon Kabushiki Kaisha, Tokyo, Japan

[21] Appl. No.: 550,517

[22] Filed: Nov. 10, 1983

Related U.S. Application Data

[63] Continuation of Ser. No. 251086, Apr. 6, 1981, abandoned.

[30] Foreign Application Priority Data

| Apr. 18, 1980 | [JP] | Japan | 55-51221 |
| Apr. 18, 1980 | [JP] | Japan | 55-51222 |
| Apr. 18, 1980 | [JP] | Japan | 55-51223 |

[51] Int. Cl.³ .................................... H04N 5/193
[52] U.S. Cl. ............................ 358/228; 358/220; 358/221; 354/441
[58] Field of Search ............ 358/228, 243, 220, 221, 358/219; 315/10; 354/26, 29, 38

[56] References Cited

U.S. PATENT DOCUMENTS

| 2,901,539 | 8/1959 | Morgan | 358/228 |
| 3,553,363 | 1/1971 | Anderson | 358/219 |
| 3,558,809 | 1/1971 | Aoki | 358/221 |
| 3,586,773 | 6/1971 | Niemyer | 358/228 |
| 3,637,937 | 1/1972 | Deveson | 358/228 |
| 3,652,792 | 3/1972 | Usagawa | 358/221 |
| 3,691,302 | 9/1972 | Gaebele | 358/219 |
| 3,934,266 | 1/1976 | Shinozoki | 358/221 |
| 4,141,043 | 2/1979 | Liu | 358/219 |
| 4,202,014 | 5/1980 | Gilligan | 358/228 |
| 4,300,167 | 11/1981 | Miller | 358/228 |
| 4,306,251 | 12/1981 | Safar | 358/219 |

Primary Examiner—Tommy P. Chin
Attorney, Agent, or Firm—Fitzpatrick, Cella, Harper & Scinto

[57] ABSTRACT

A video camera having an image tube and a detector for detecting the operation state of the image tube. The light intensity from an object to the image tube is controlled in accordance with the output signal from said detector.

22 Claims, 26 Drawing Figures

VIDEO CAMERA IMAGE TUBE BURN-IN PREVENTION APPARATUS

This application is a continuation of application Ser. No. 251,086 filed Apr. 6, 1981, now abandoned.

BACKGROUND OF THE INVENTION

1. Field of the Invention

The present invention relates to a video camera utilizing an imaging tube, and more particularly to a video camera capable of preventing burn on the imaging face of the imaging tube caused by a high-luminance object immediately after the start of imaging operation.

2. Description of the Prior Art

A burning phenomenon takes place on the photoelectric face in a video camera utilizing an imaging tube, when an object of a high luminance is exposed to said face. Due to this phenomenon, the image of said high-luminance object persists for a long time in the output signals of the imaging tube or in the reproduced picture and remains even after the camera is directed to another object, thus severely deteriorating the reproduced image quality. This may even cause a permanent burn due to a permanent defect in the photoelectric face of the imaging tube, in case the luminance of the object is extremely high. In order to prevent such burning phenomenon when the camera is inadvertently directed to a high-luminance object, there is conventionally proposed a burn preventing device having a diaphragm aperture positioned between the lens and the photoelectric face and automatically closed for reducing the incident light when the photoelectric face is exposed to the image of the high-luminance object. Such device is generally known as an automatic exposure control device. Such burn preventive function is already well known as one of the functions employed in the video cameras, and is appropriate for protecting the photoelectric face while the camera is in operative state. On the other hand, such burning phenomenon occurs by the exposure to a high-intensity light even when the camera is cut-off from the power supply, and it is already known that marked burn appears, particularly, when the beam current is cut-off in the imaging tube. For this reason, there is already proposed a camera in which the diaphragm is closed forcedly at the power cut-off in order to avoid such burning phenomenon when the camera in operative state is cut-off from the power supply.

The burning phenomenon can still appear at the start of power supply, however, even if the camera is provided with both preventive functions mentioned above. In such state the insufficiently warmed heater of the tube does not provide the beam current so that the tube does not provide the output signal even if the photoelectric face is exposed to a high-luminance object. On the other hand, the aforementioned automatic exposure control tends to open the diaphragm in response to the low output signal in this state, thus exposing the photoelectric face of the imaging tube to the light of a high intensity and leading to a severe burn. Also the absence of beam current in this state enhances the burn, resulting in a significant damage to the tube.

SUMMARY OF THE INVENTION

The object of the present invention is to provide a video camera improved in the aforementioned aspects.

Another object of the present invention is to provide a video camera capable of identifying the state of the imaging tube and accordingly controlling the incident light thereto.

Still another object of the present invention is to provide a video camera in which the photoelectric face is shielded from incident light until the dark current of the imaging tube reaches a determined level, or until the beam amount in the imaging tube is detected to reach a determined level, or until the heater of the imaging tube is detected to have been sufficiently warmed, thereby preventing the burning phenomenon of said photoelectric face.

Still another object of the present invention is to provide a video camera comprising an imaging tube, detecting means for detecting the function state of said imaging tube, and control means for controlling the amount of light entering said imaging tube from the object in response to the output signal of said detecting means.

Still another object of the present invention is to provide a video camera comprising an imaging tube, a shutter positioned between said imaging tube and the object for intercepting the light path, detecting means for detecting the function state of said imaging tube when it is powered, and control means for controlling said shutter in response to the detection signal from said detecting means.

Still another object of the present invention is to provide a video camera capable of detecting the function state of an imaging tube at the start of power supply thereto, and controlling an exposure control circuit for controlling the amount of light entering said imaging tube in response to the result of said detection thereby preventing the burning phenomenon of said imaging tube.

Still another object of the present invention is to provide a video camera comprising an imaging tube, exposure control means for controlling the amount of light entering said imaging tube from an object, detecting means for detecting the function state of said imaging tube at the start of power supply thereto, and control means for controlling said exposure control means in response to the output signal from said detecting means.

Still other objects of the present invention will become apparent from the following description of the embodiment thereof to be taken in conjunction with the attached drawings.

BRIEF DESCRIPTION OF THE DRAWINGS

FIG. 6 is a waveform chart showing the function of the dark current detecting circuit shown in FIG. 5, wherein:

Figure 2:
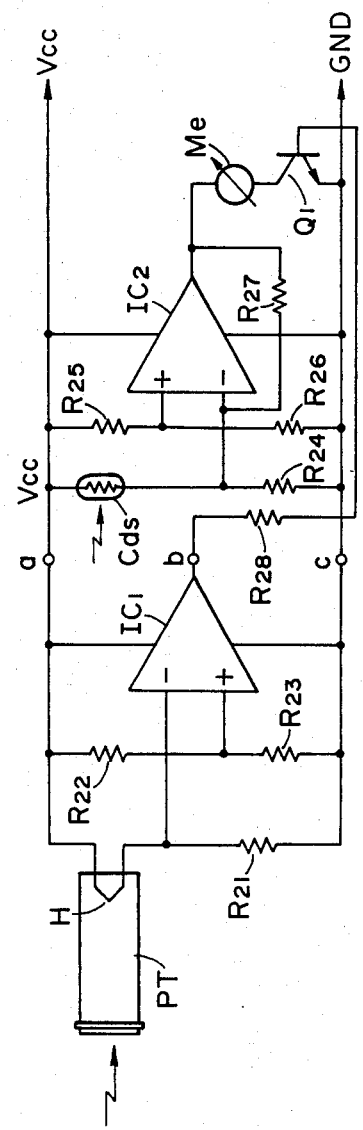
FIG. 2 is a diagram of a control circuit for use in the optical system shown in FIG. 1.
Figure 7:
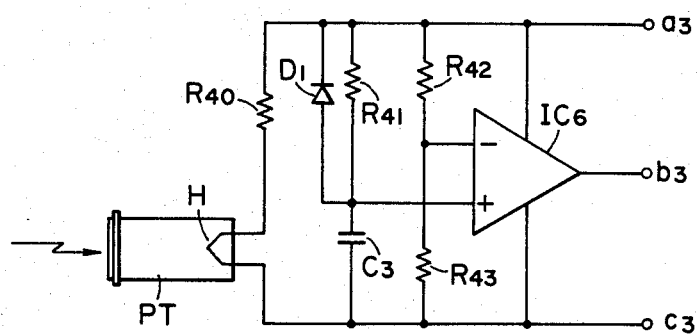
Figure 8:
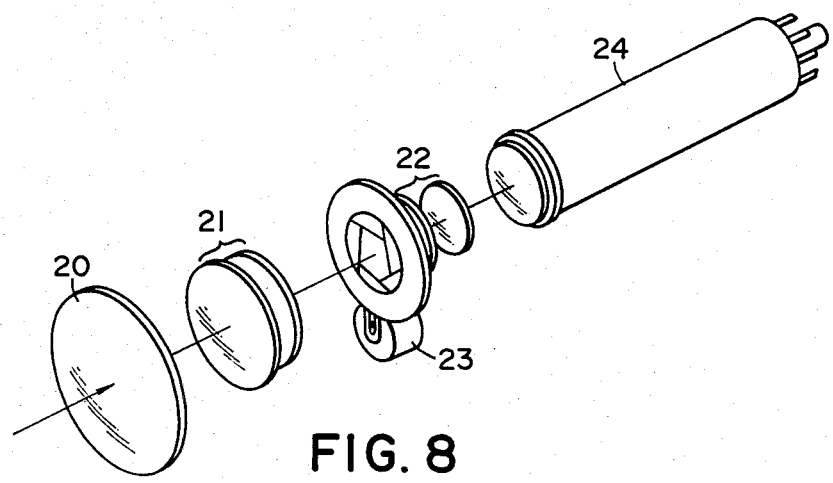
Figure 9:
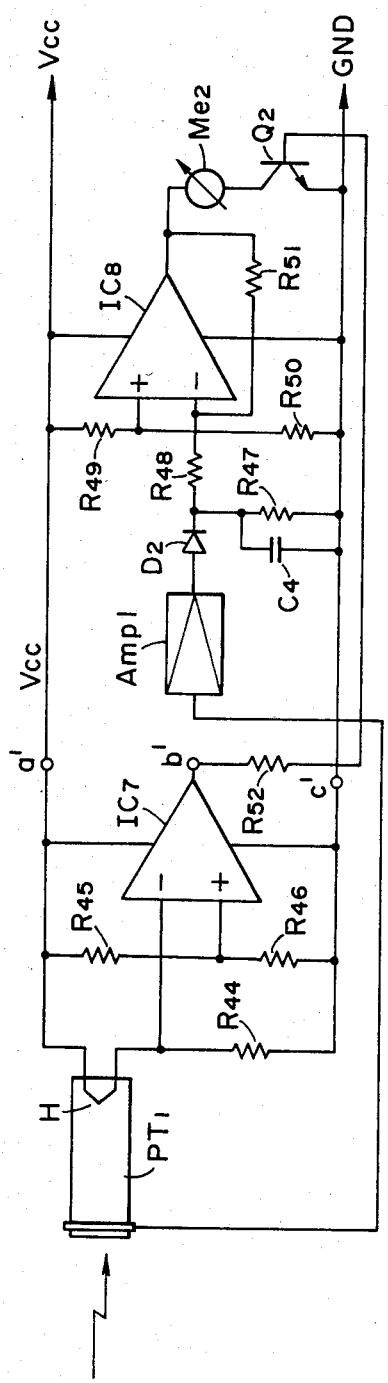
Figure 10:
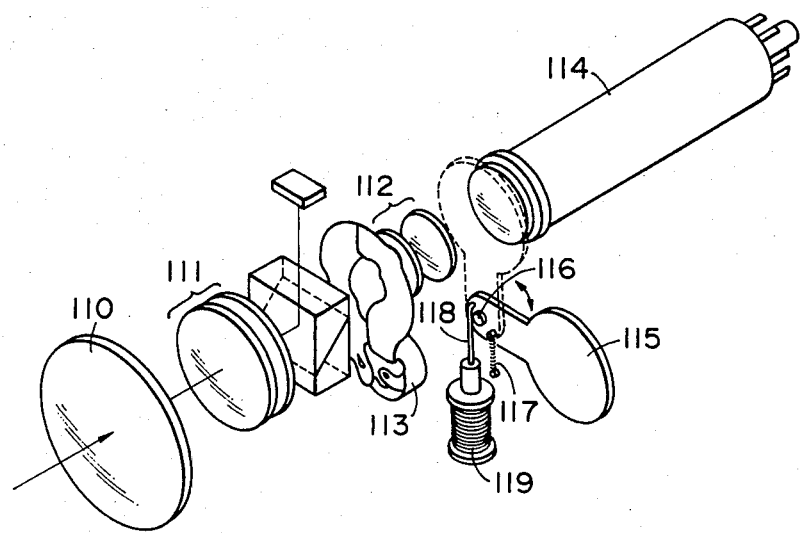
Figure 11:
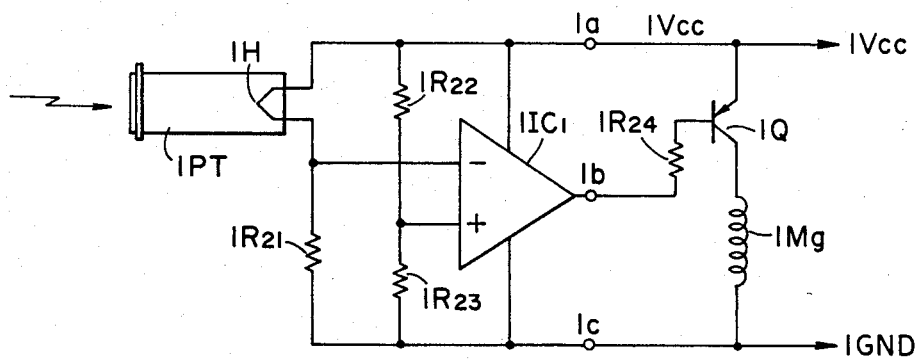
Figure 12:
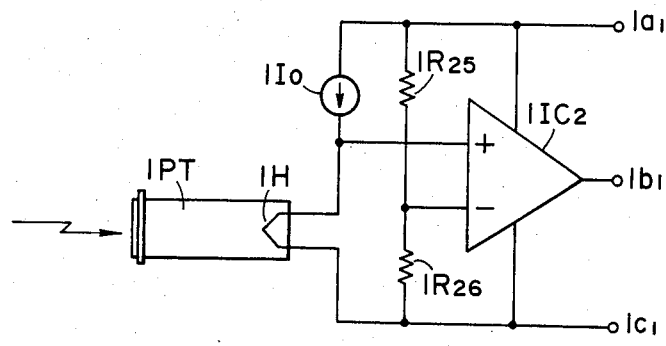
Figure 13:
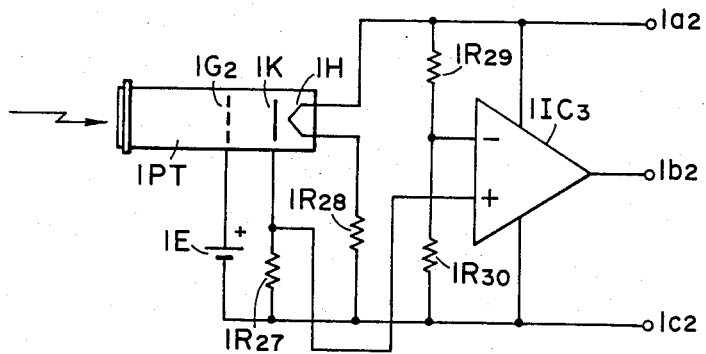
Figure 14:
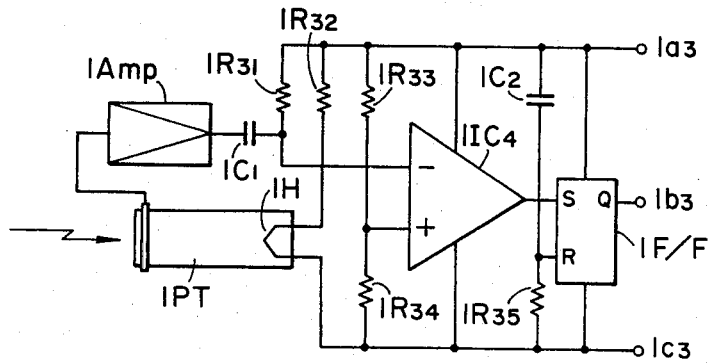
Figure 15:
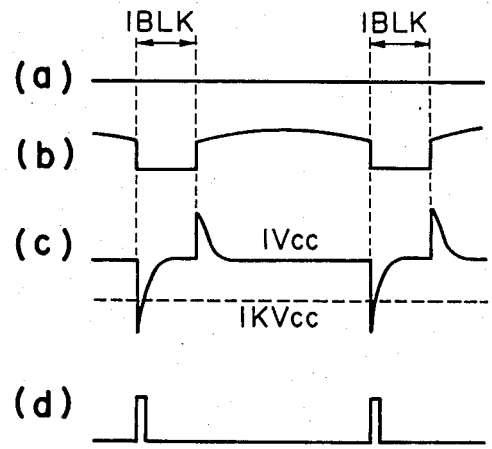
Figure 16:
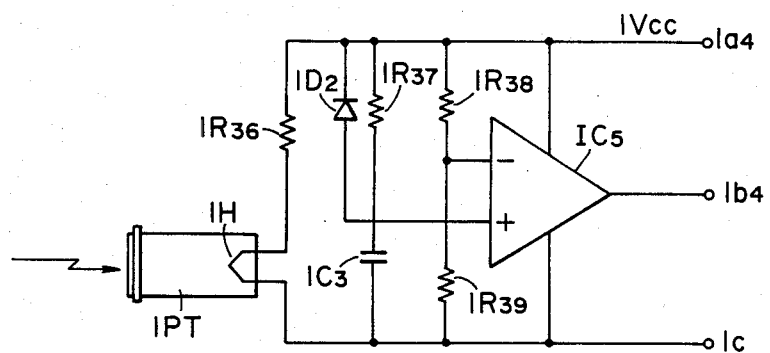
Figure 17:
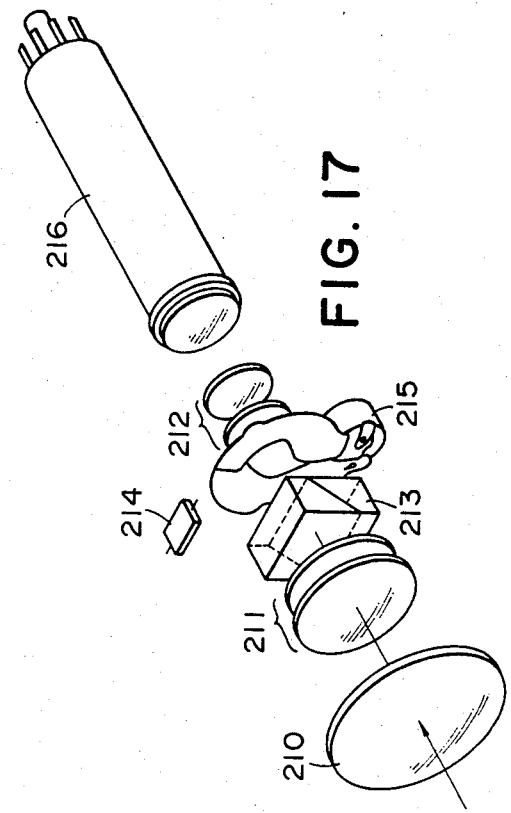
Figure 18:
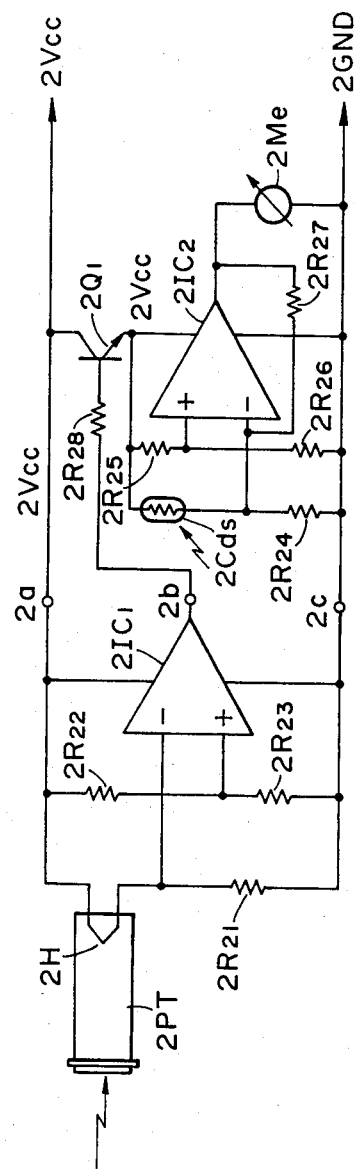
Figure 19:
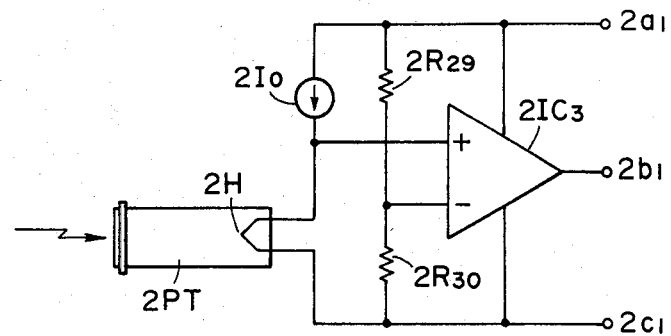
Figure 20:
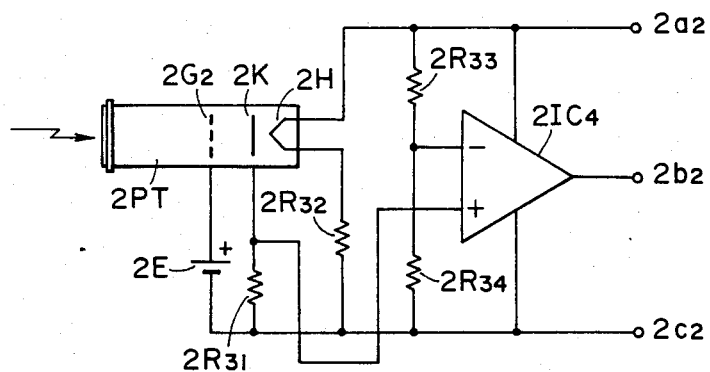
Figure 21:
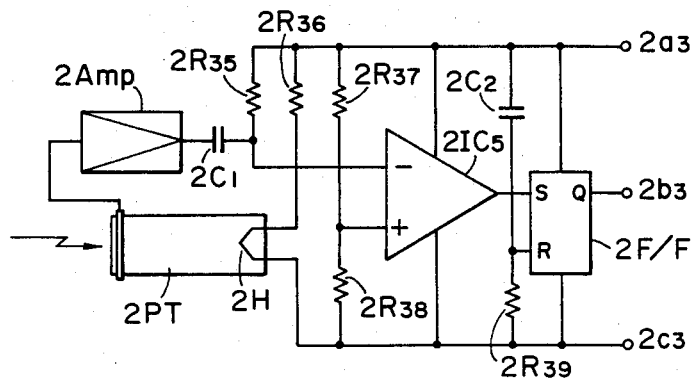
Figure 22:
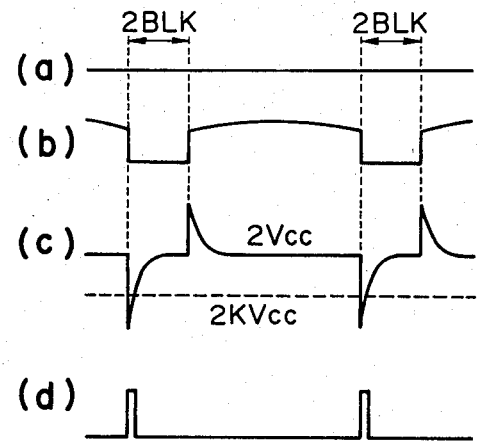
Figure 23:
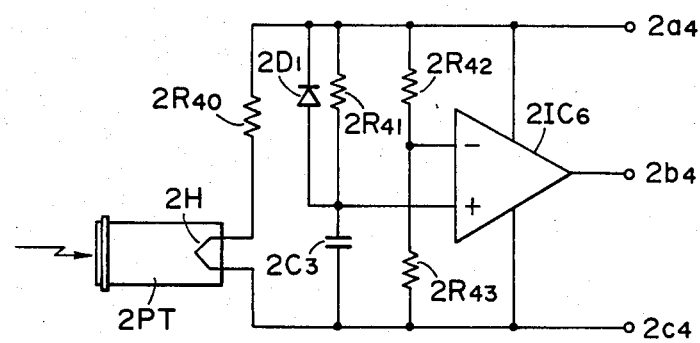
Figure 24:
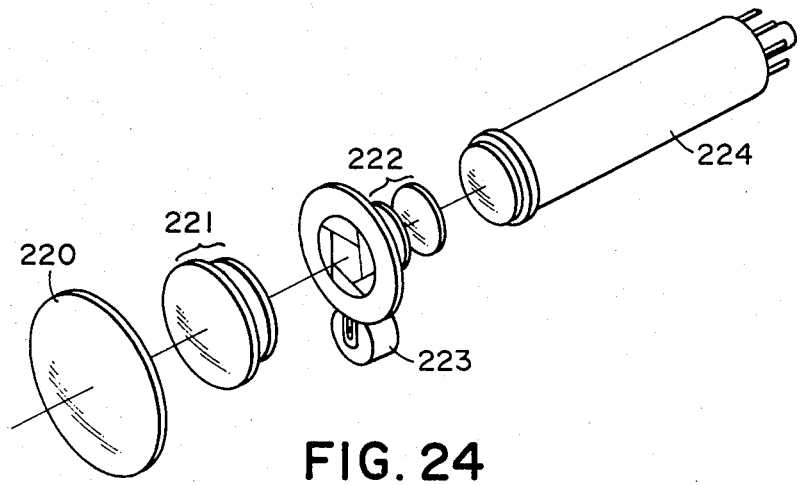
Figure 25:
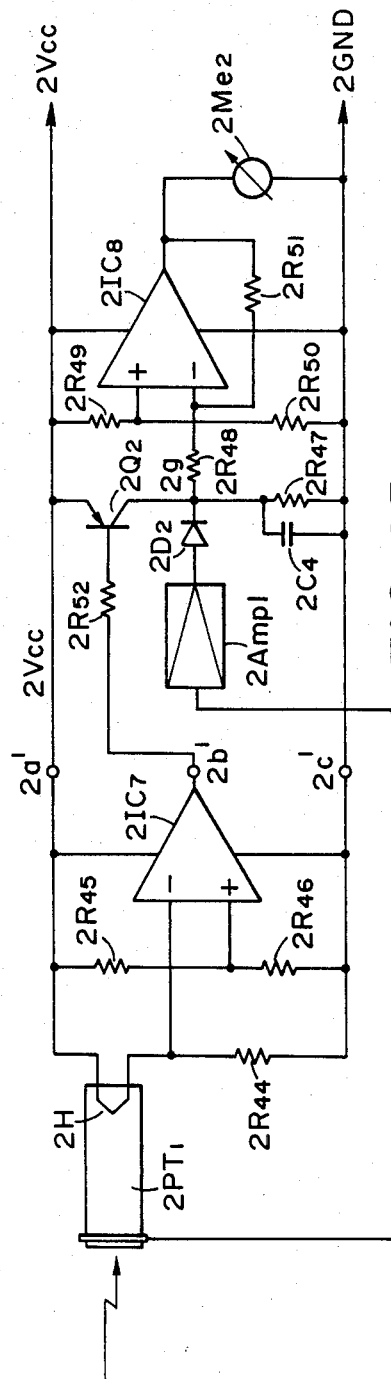
Figure 26:
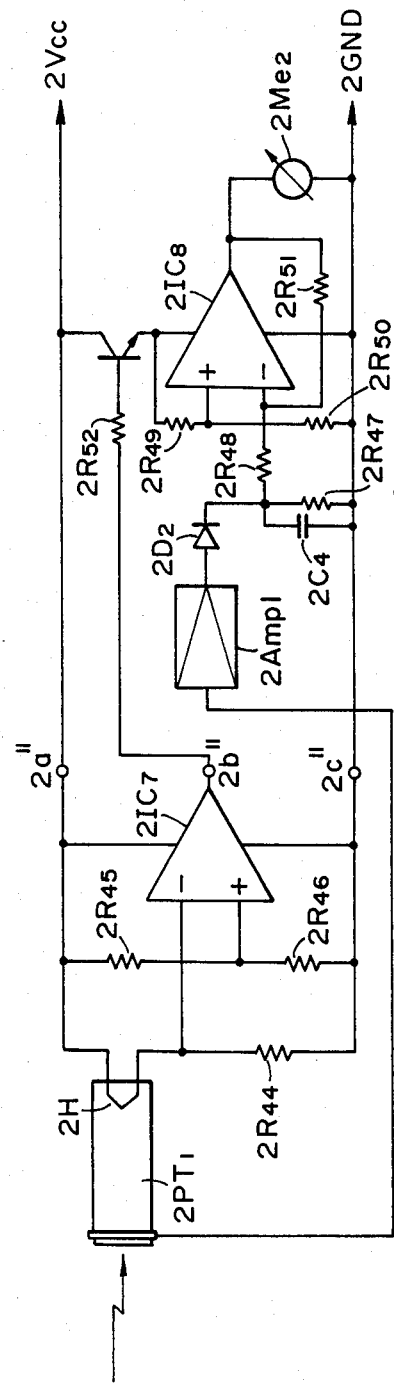

(a) is a chart of a waveform of output signal from the imaging tube in the absence of beam current;
(b) is a chart of a waveform of output signal from the imaging tube in the presence of beam current;
(c) is a chart of a waveform differentiated from (b); and
(d) is a chart of a switching waveform at the dotted line level of (c);

FIG. 7 is a diagram of a detecting circuit having a timer circuit representing another embodiment of the detecting circuit shown in FIG. 2;

FIG. 8 is a perspective view of an optical system representing another embodiment of the present invention;

FIG. 9 is a diagram of a control circuit for use in the optical system shown in FIG. 8;

FIG. 10 is a perspective view of an optical system representing another embodiment of the present invention;

FIG. 11 is a diagram of a control circuit for use in the optical system shown in FIG. 10;

FIG. 12 is a diagram of a heater voltage detecting circuit representing another embodiment of the detecting circuit shown in FIG. 11;

FIG. 13 is a diagram of a beam current detecting circuit representing another embodiment of the detecting circuit shown in FIG. 11;

FIG. 14 is a diagram of a dark current detecting circuit representing another embodiment of the detecting circuit shown in FIG. 11;

FIG. 15 is a waveform chart showing the function of the dark current detecting circuit shown in FIG. 14, wherein:
(a) is a chart of a waveform of the output signal from the imaging tube in the absence of the beam current;
(b) is a chart of a waveform of the output signal from the imaging tube in the presence of the beam current;
(c) is a chart of a waveform differentiated from (b); and
(d) is a chart of a switching waveform at the dotted line level of (c);

FIG. 16 is a diagram of a detecting circuit having a timer circuit representing another embodiment of the detecting circuit shown in FIG. 11;

FIG. 17 is a perspective view of an optical system representing another embodiment of the present invention;

FIG. 18 is a diagram of a control circuit for use in the optical system shown in FIG. 17;

FIG. 19 is a diagram of a heater voltage detecting circuit representing another embodiment of the detecting circuit shown in FIG. 18;

FIG. 20 is a diagram of a beam current detecting circuit representing another embodiment of the detecting circuit shown in FIG. 18;

FIG. 21 is a diagram of a dark current detecting circuit representing another embodiment of the detecting circuit shown in FIG. 18;

FIG. 22 is a waveform chart showing the function of the dark current detecting circuit shown in FIG. 21, wherein:
(a) is a chart of a waveform of the output signal from the imaging tube in the absence of the beam current;
(b) is a chart of a waveform of the output signal from the imaging tube in the presence of the beam current;
(c) is a chart of a waveform differentiated from (b); and
(d) is a chart of a switching waveform at the dotted line level of (c);

FIG. 23 is a diagram of a detecting circuit having a timer circuit representing another embodiment of the detecting circuit shown in FIG. 18;

FIG. 24 is a perspective view of an optical system representing another embodiment of the present invention;

FIG. 25 is a diagram of a control circuit for use in the optical system shown in FIG. 25; and FIG. 26 is a diagram showing another embodiment of the control circuit shown in FIG. 25.

DESCRIPTION OF THE PREFERRED EMBODIMENTS

Figure 1:
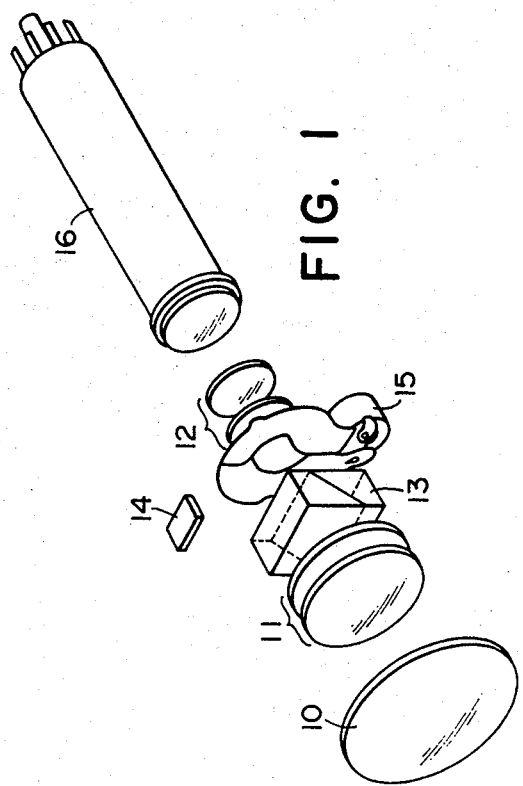
FIG. 1 is a perspective view of an optical system embodying the present invention.

FIG. 1 shows, in a perspective view, an optical system embodying the present invention, comprising a focusing lens system 10, a zooming lens system 11, a relay lens system 12, a half mirror 13, a photosensor 14, a diaphragm 15 and an imaging tube 16. In its non-operative state, the diaphragm is not powered and is therefore closed. In its operative state, the incident light guided through the focusing lens system 10 and zooming lens system 11 is partly reflected by the half mirror 13 and introduced into the photoreceptor 14, the output of which controls the diaphragm 15. The light passing through the half mirror 13 is reduced to an appropriate intensity by the diaphragm 15 and focused by the relay lens system 12 onto a photoelectric face of the imaging tube 16. At the start of its operative state, the diaphragm 15 is closed to minimum by cutting off the power supply thereto until a stable function state is identified by an appropriate level of the beam current in the imaging tube 16.

The aforementioned function of the optical system is achievable by a control circuit as shown in FIG. 2, wherein a picture tube or imaging tube PT corresponds to the tube 16 shown in FIG. 1. In the present embodiment the function state of the imaging tube is identified by the heater current thereof. For this purpose the heater H of the imaging tube PT is connected to an unrepresented power source through a resistor R21. Resistors R22 and R23 are serially connected to the unrepresented power source, and provide, at the junction point therebetween, a reference potential for identifying the function state of the imaging tube PT.

A comparator IC1 compares the potential at the junction point between said heater H and resistor R21 with said reference potential and provides the result of said comparison.

A photoreceptor CdS, corresponding to the photoreceptor 14 in FIG. 1, is connected to the power source through a resistor R24 and provides a potential indicating the light intensity at the junction point with said resistor. Resistors R25, R26 provide a potential indicating a reference light intensity.

A comparator IC2 compares the potential at said photoreceptor CdS with said reference potential for light intensity and provides an output signal for controlling a diaphragm Me, corresponding to 15 in FIG. 1, connected at a terminal thereof to the output terminal of said comparator IC2.

A switching element Q1 is controlled by the output signal of the aforementioned comparator IC1 to connect the other terminal of said diaphragm Me to the unrepresented power source.

The function of the above-explained circuit is as follows.

Immediately after the start of power supply from said power source, the heater H of the imaging tube PT, being still unwarmed, shows a sufficiently smaller resistance than that of the resistor R21 to provide a lower voltage to the negative input terminal of the comparator IC1 than the reference potential at the positive input terminal thereof obtained by division of the power source voltage VCC through the resistors R22, R23, whereby said comparator IC1 provides an L-level output substantially equal to the ground level. When the heater H is sufficiently warmed to reach a determined resistance after the lapse of a certain time, the comparator IC1 receives a lower voltage at the negative input terminal than the voltage at the positive input terminal to release an H-level output substantially equal to the power source voltage VCC. At this point the beam current becomes sufficient for image-taking.

The circuit portion at the right-hand side of the junction points a, b and c constitutes an automatic exposure control circuit of so-called external light-measuring type in which the photoreceptor CdS is positioned in front of the diaphragm and photoelectric face. In this circuit, for example in response to an increasing luminance of the object, the photoreceptor CdS reduces the resistance thereof to increase the voltage supplied to the negative input terminal of the comparator IC2, whereby the output signal therefrom to the diaphragm Me is decreased to reduce the diaphragm aperture. The diaphragm mechanism employed herein has to be of a structure closing the aperture in the absence of voltage supply and enlarging the aperture in response to the increase in voltage supply. Also the comparator IC2 is so structured as to reduce the voltage supplied to the diaphragm Me when the voltage divided by the resistor R24 and the photoreceptor CdS becomes higher than the voltage divided by the resistors R25, R26 in response to the light received by said photoreceptor CdS, and a resistor R27 is provided for determining the sensitivity of the automatic exposure control circuit. In said circuit the transistor Q1 connected serially with the diaphragm Me allows normal function of said circuit and the diaphragm Me in the on-state of said transistor but maintains the diaphragm Me closed in the off-state regardless of the output signal from the comparator IC2. The detection circuit for identifying the function state of the imaging tube, positioned at the left-hand side of the junction points a, b and c, provides the detection signal through the junction b and a resistor R28 to the base of said transistor Q1, so that the diaphragm Me is forcedly closed to shield the imaging tube PT from incident light during a period immediately after the start of power supply to the camera, until the heater becomes sufficiently warmed.

Figure 3:
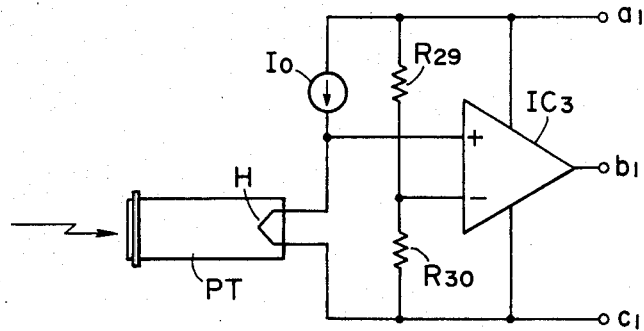
FIG. 3 is a diagram of a heater voltage detecting circuit representing another embodiment of the detecting circuit shown in FIG. 2.

In contrast to the foregoing embodiment in which the function state of the imaging tube PT is identified by the heater current thereof, another embodiment utilizing heater resistance for the same purpose is shown in FIG. 3 wherein the same components as those in FIG. 2 are represented by same numbers.

In FIG. 3, a constant current source I0, which can be composed of a known circuit structure, provides a constant current to the heater H of the imaging tube PT.

Resistors R29, R30 provide, at the junction therebetween, a potential indicating the resistance of said heater H in the normal function state.

A comparator IC3 is connected at the positive input terminal thereof to said heater H and at the negative input terminal to the junction between said resistors R29, R30. Also the terminals a', b' and c' in FIG. 3 are connected to those a, b and c in FIG. 2. The above-explained circuit functions in the following manner.

Immediately after the start of power supply, the heater H of the imaging tube PT, being still unwarmed, shows a low resistance, whereby the voltage across said heater H caused by the constant current from the constant current source I0 is smaller than that across the resistor R30 obtained by division of the power source voltage VCC through the resistors R29, R30. Consequently the comparator IC3 receives a lower voltage at the positive input terminal than at the negative input terminal to provide an L-level output substantially equal to the ground level. When the heater H is sufficiently warmed to reach a determined resistance after the lapse of a certain time, the comparator IC3 receives a higher voltage at the positive input terminal than at the negative input terminal to provide an H-level output substantially equal to the power source voltage VCC, when the beam current reaches a level sufficient for image-taking. Thus the diaphragm Me is controlled by the output signal from the comparator IC2 shown in FIG. 2.

Figure 4:
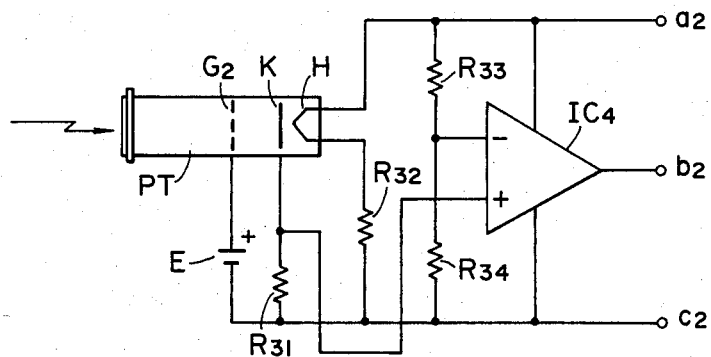
FIG. 4 is a diagram of a beam current detecting circuit representing another embodiment of the detecting circuit shown in FIG. 2.

FIG. 4 shows another embodiment of the detecting circuit for identifying the function state of the imaging tube, utilizing the beam current thereof, wherein the same components as those in FIG. 2 are represented by same numbers. In FIG. 4 there are shown an accelerating electrode G2 of the imaging tube PT, a cathode K and a high-voltage generating circuit E powered by the power source VCC of the camera circuit and supplying a high voltage to said accelerating electrode G2.

A resistor R31 converts the beam current into a voltage. A resistor R32 is connected, in series with the heater H, to the power source. Resistors R33, R34 provides a reference potential indicating the reference level of the beam current. A comparator IC4 compares the potential at said resistor R31 with that at the junction between the resistors R33, R34. While the heater H is unwarmed immediately after the start of power supply, there appears no beam current so that no potential is given across the resistor R31. On the other hand the heater is heated by the current through the resistor R32. In this state, as the voltage divided by the resistors R33 and R34 from the power source voltage VCC and supplied to the negative input terminal of the comparator IC4 is higher than the voltage supplied to the positive input terminal thereof from the resistor R31, the comparator IC4 provides an L-level output substantially equal to the ground level. The beam current reaches a level sufficient for image-taking when the heater is warmed after the lapse of a certain time, whereby the resistor R31 generates a determined potential higher than the voltage supplied to the negative input terminal of the comparator IC4 to obtain therefrom an H-level output substantially equal to the power source voltage VCC. In this manner the switching element Q1 in FIG. 2 is turned on to allow the control of the diaphragm Me by the output from the comparator IC2.

Figure 5:
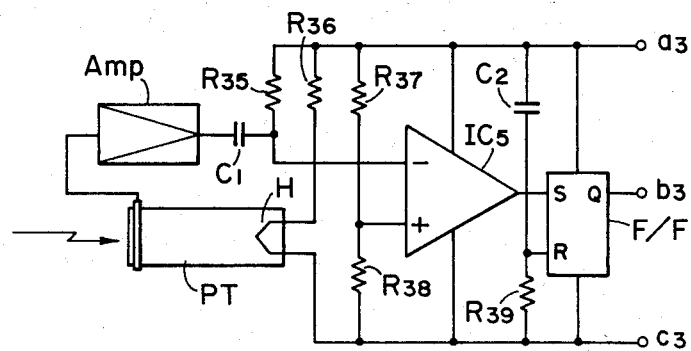
FIG. 5 is a diagram of a dark current detecting circuit representing another embodiment of the detecting circuit shown in FIG. 2.

As a variation to the detecting circuit shown in FIG. 2, FIG. 5 shows another embodiment of the detecting circuit utilizing the absence of dark current when the imaging tube has no beam current, wherein the same components as those in FIG. 2 are represented by same numbers. In FIG. 5 there are shown a preamplifier Am for amplifying the image signals from the imaging tube PT, a condenser C1, a resistor R35, a resistor R36 connected to the heater H of the imaging tube PT. and resistors R37, R38 for providing at the junction therebetween a reference potential for the dark current.

There are further added a comparator IC5 for comparing the potential at the junction between the resistor R35 and condenser C1 with that at the junction between the resistors R37, R38, a condenser C2, a resistor R40, and a flip-flop F/F connected at the rest port thereof to the junction between the condenser C2 and resistor R39 and at the set port S to said comparator IC5 and supplying an output signal Q for controlling the aforementioned switching element Q1. The above-explained detecting circuit functions in the following manner.

Figure 6:
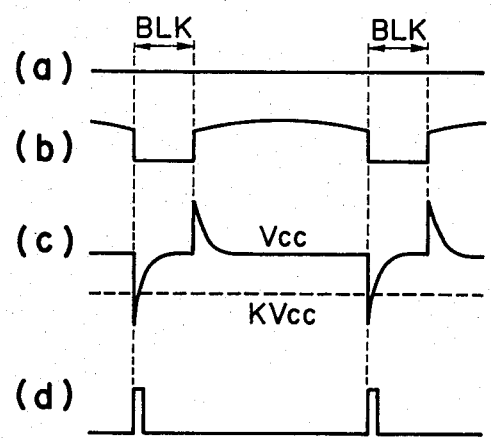

In the absence of beam current during the unwarmed state of the heater H, the preamplifier Amp provides no output signals as shown in FIG. 6(a). However, when the beam current reaches a determined level after the heating of the heater H, there is obtained, in the absence of incident light to the photoelectric face of the imaging tube PT, a waveform as shown in FIG. 6(b), through amplification by the preamplifier Amp of so-called dark current generated by the beam current in the imaging tube PT. The dark current does not appear in the blanking period BLK in which the beam is usually cut-off. Immediately after the start of power supply when the heater H is still unwarmed to provide the output as shown in FIG. 6(a) from the preamplifier Amp, the negative input terminal of the comparator IC6 receives the power source voltage VCC appearing at the junction between the condenser C1 and resistor R35, which is higher than a voltage KVCC obtained by the division of said voltage VCC through the resistors R37, R38, so that the comparator IC5 releases an L-level output substanitally equal to the ground level.

The flip-flop F/F, of R-S type releasing an H-level output Q upon receipt of an H-level trigger pulse close to the voltage VCC at the set input port S and an L-level output Q upon receipt of an H-level trigger pulse at the reset input port R, is maintained in the reset state with L-level output Q at the start of power supply by a trigger signal supplied from a differentiating circuit composed of the condenser C2 and resistor R39.

When the beam current reaches a determined level by sufficiently warmed heater after the lapse of a certain time, the preamplifier Amp provides, in the aforementioned manner, an output shown in FIG. 6(b) which is supplied, through said circuit of the condenser C2 and resistor R39, to the negative input terminal of the comparator IC5 in a waveform shown in FIG. 6(c), wherein KVCC represents the voltage level supplied to the positive input terminal. Consequently the comparator IC5 provides an output as shown in FIG. 6(d) in which the H-level and L-level are substantially equal, respectively, to VCC and the ground level. Thus the output of the flip-flop F/F is maintained at L-level after the start of power supply to the camera and shifted to H-level when the beam current reaches a determined level, said H-level state being naturally maintained until the power supply is again cut-off.

As a variation to the circuit shown in FIG. 2, FIG. 7 shows another embodiment of the detecting circuit utilizing indirect detection of the function state of the imaging tube, wherein the same components as those in FIG. 2 are represented by same numbers. In the present embodiment, a timer circuit programmed to a given time from the start of power supply to the operative state which is substantially constant for each imaging tube is activated at the start of power supply, and the switching element Q1 is controlled by the output signal from said timer circuit. In FIG. 7 there are shown a resistor R40 connected to the heater H, a resistor R41 and a condenser C3 constituting said timer circuit, a diode D1 for discharging said condenser C3, resistors R42, R43 for identifying the charged voltage of the condenser C3, and a comparator IC6 for comparing the voltage across the condenser C3 with that obtained by said resistors R42, R43. The above-explained circuit functions in the following manner.

Upon turning on of the power supply to the camera circuit, the heater H of the imaging tube PT is heated by the current supplied through the resistor R40, and the condenser C3 is charged simultaneously through the resistor R41. The negative input terminal of the comparator IC6 receives a voltage divided by the resistors R42, R43 from the power source voltage VCC.

Consequently, in the initial period of charging of the condenser C3, the comparator IC6 receives a higher voltage at the negative input terminal thereof than at the positive input terminal to release an L-level output. Then, after the lapse of a time determined by the condenser C3 and resistor R41, the voltage at said positive input terminal exceeds that at the negative input terminal to invert said output to H-level. Said time is selected longer than the time required for reaching a determined beam current after the start of heating of the heater H.

The aforementioned timer circuit can also be composed of a digital timer for counting clock pulses. For example, a digital timer, set at a determined count by a signal generator at the start of power supply, counts clock pulses supplied from a clock generator, and releases an output signal when said count is reached.

FIG. 8 shows, in a perspective view, another optical system embodying the present invention, comprising a focusing lens system 20, a zooming lens system 21, a relay lens system 22, a diaphragm 23 and an imaging tube 24. In its non-operative state, the diaphragm 23 is closed to shield the imaging tube 24 from the incident light. In its operative state, the incident light guided through the focusing lens system 20, zooming lens system 21 and diaphragm 23 is focused by the relay lens system 22 onto a photoelectric face of the imaging tube 24. An appropriate light amount is obtained by feedback control of said diaphragm 23 by the output signal from said imaging tube 24. At the start of function the diaphragm 23 is maintained closed by the control circuit therefor until the beam current of the imaging tube 24 reaches an appropriate level for a stable function.

The aforementioned function of the optical system is achievable by a control circuit as shown in FIG. 9, wherein a picture tube or imaging tube PT1 corresponds to the tube 24 shown in FIG. 8. In the present embodiment, the function state of the imaging tube is identified by the heater current thereof. For this purpose the heater H of the imaging tube PT1 is connected to an unrepresented power source through a resistor R44. Resistors R45 and R46 are serially connected to the unrepresented power source, and provide, at the junction therebetween, a reference potential for identifying the function state of the imaging tube PT1.

A comparator IC7 compares the potential at the junction between said heater H and resistor R44 with said reference potential and provides the result of said comparison.

There are also shown an amplifier Ampl for amplifying the image signals from the imaging tube PT1; a diode D2 for rectifying the image signals; a condenser C4 and a resistor R47 which convert in combination with said diode D2 the image signals into DC signals; a resistor R48 connected to the output terminal of said diode D2; resistors R49, R50 for providing a reference voltage as will be explained later; a comparator IC8 for comparing the image signals supplied through resistor R48 with the reference signal obtained from the resistors R49, R50 and providing an inverted output signal; a resistor R51 for determining the feedback level; a diaphragm Me corresponding to 23 in FIG. 8; a switching element Q2 controlled by the output signal from said comparator IC7 to connect said diaphragm Me to the ground; and a resistor R52. The above-explained circuit functions in the following manner.

The circuit portion present at the left-hand side of the junctions a', b' and c' constitutes a detecting circuit of which function was already explained in connection with FIG. 2.

The circuit portion present at the right-hand side of said junctions a', b' and c' constitutes an automatic exposure control circuit so designed as to maintain the image signals supplied from the imaging tube PT1 and amplified by the amplifier Ampl at a constant level. More specifically, the image signals are supplied, after DC conversion by the diode D1, condenser C4 and resistor R47, to an inverting amplifier composed of the comparator IC8 and resistors R49, R50, R51. Thus, in response to a larger amplitude of the image signal corresponding to a higher luminance of the object, a larger DC voltage is applied to the comparator IC8 to obtain a lower output voltage therefrom, thus reducing the diaphragm aperture. In this manner the imaging tube PT1 provides a lower output voltage, and an equilibrium is reached when the input voltage to the negative input terminal of the comparator IC8 becomes substantially equal to the voltage divided by the resistors R49, R50 and supplied to the positive input terminal thereof, thus achieving an automatic exposure control. The diaphragm mechanism employed in the present embodiment has to be of a structure adapted for closing the diaphragm aperture in the absence of voltage supply and enlarging the aperture according to the voltage supplied. In said automatic exposure control circuit, the switching element Q2 serially connected with the diaphragm Me allows normal function of said circuit during the one-state of said switching element Q2 but maintains the diaphragm Me closed in the off-state regardless of the output signal from the amplifier IC8. The detecting circuit for identifying the function state of the imaging tube, positioned at the left-hand side of the junctions a', b' and c', provides the detection signal through the junction b' and a resistor R52 to the base of switching element Q2, to turn on said element by the L-level base potential after the start of power supply to the camera thus forcedly closing the diaphragm Me. The aforementioned detecting circuit at the left-hand side of junctions a', b' and c' in FIG. 9 can be modified in a similar manner as in FIGS. 3, 4, 5 and 7 explained as variations to the embodiment shown in FIG. 2.

As explained in the foregoing, the present invention allows, in combination with an automatic exposure control adapted for closing the diaphragm in the non-operative state, closing of the diaphragm by forcedly interrupting the power supply thereto regardless of the output signal from the automatic exposure control circuit until the imaging tube reaches a stable function state after the start of power supply to the camera, thereby preventing the burning phenomenon in the photoelectric face of the imaging tube and thus providing an easily usable video camera.

Now, FIG. 10 shows, in a perspective view, an optical system representing another embodiment of the present invention, comprising a focusing lens system 110, a zooming lens system 111, a relay lens system 112, a diaphragm 113, an imaging tube 114, a shutter 115, a shaft 116 about which said shutter 115 is rendered rotatable, a spring 117 connected at an end thereof to a fixed mount on the unrepresented camera body and at the other end to said shutter 115, and a shutter rotation limiting member 118 commected at an end to said shutter 115 and fitted at the other end into a solenoid 119. In this optical system, at the start of function, the solenoid 119 is energized to interrupt the optical path by means of the shutter 115 until the beam current in the imaging tube 114 reaches an appropriate level for stable function.

The aforementioned function of the optical system is achievable by a control circuit as shown in FIG. 11, wherein a picture tube or imaging tube PT corresponds to the tube 114 shown in FIG. 10. In the present embodiment the function state of the imaging tube is identified by the heater current thereof. For this purpose the heater H of said imaging tube PT is connected to an unrepresented power source through a resistor 1R21. Resistors 1R22 and 1R23 are serially connected to the unrepresented power source, and provide, at the junction therebetween, a reference potential for identifying the function state of the imaging tube PT.

A comparator 1IC1 compares the potential at the junction between said heater H and resistor 1R21 with said reference potential and provides the result of said comparison.

A transistor 1Q is controlled by the output signal of said comparator IC1 supplied through a resistor R24.

A solenoid Mg, corresponding to 119 in FIG. 10, is energized when said transistor 1Q is turned on.

The above-explained embodiment functions in the following manner.

Immediately after the start of power supply from said power source, the heater 1H of the imaging tube 1PT, being still unwarmed, shows a sufficiently smaller resistance than that of the resistor 1R21 to provide a lower voltage to the negative input terminal of the comparator IC1 than the reference potential at the positive input terminal thereof obtained by division of the power source voltage 1Vcc through the resistors 1R22 and 1R23, whereby said comparator 1IC1 provides an L-level output substantially equal to the ground level. When the heater 1H is sufficiently warmed to reach a determined resistance after a certain time, the comparator 1IC1 receives a lower voltage at the negative input terminal than at the positive input terminal and thus releases an H-level output substantially equal to the power source voltage 1Vcc, when the beam current assumes a level sufficient for image-taking.

The circuit portion at the right-hand side of the junctions 1a, 1b and 1c constitutes a shutter drive circuit for energizing the solenoid 1Mg, to close the shutter 115 in the present embodiment, in the on-state of said transistor 1Q and to open said shutter 115 in the off-state of said transistor. The detecting circuit for identifying the function state of the imaging tube, positioned at the left-hand side of the junctions 1a, 1b and 1c, provides the detection signal through the junction 1b and a resistor 1R24 to the base of said transistor 1Q. Thus the transistor is turned on by the L-level base potential after the start of power supply to the camera to close the shutter 115, and is turned off to open said shutter 115 when the imaging tube reaches a stable function state.

In this manner the imaging tube is shielded from the incident light by said shutter until the heater 1H becomes sufficiently heated after the start of power supply to the camera.

As variations to the foregoing embodiment in which the function state to the imaging tube 1PT is identified by the heater current thereof, FIGS. 12, 13, 14 and 16 show other embodiments capable of replacing the detecting circuit at the left-hand side of the junctions 1a, 1b and 1c in FIG. 11.

FIG. 12 shows another embodiment of the detecting circuit for identifying the function state of the imaging tube from the heater resistance thereof, wherein the same components as those in FIG. 11 are represented by same numbers.

A constant current source 1I0, which can be of a known circuit structure, provides a constant current to the heater 1H to the imaging tube 1PT.

Resistors 1R25, 1R26 provide, at the junction therebetween, a potential indicating the resistance of said heater 1H in the normal function state.

A comparator 1IC2 is connected at the positive input terminal thereof to said heater 1H and at the negative input terminal to the junction between said resistors 1R25 and 1R26. Also the terminals 1a1, 1b1 and 1c1 are connected to those 1a, 1b and 1c in FIG. 11. The above-explained circuit functions in the following manner.

Immediately after the start of power supply, the heater 1H of the imaging tube 1Pt, being still unwarmed, shows a low resistance, whereby the voltage across said heater 1H caused by the constant current from the constant current source 1I0 is smaller than that across the resistor 1R26 obtained by division of the power source voltage Vcc through the resistors 1R25, 1R26. Consequently the comparator 1TC2 receives a lower voltage at the positive input terminal than at the negative input terminal to provide an L-level output substantially equal to the ground level. When the heater 1H is sufficiently warmed to reach a determined resistance after a certain time, the comparator 1IC2 receives a higher voltage at the positive input terminal than at the negative input terminal to provide an H-level output substantially equal to the power surce voltage 1Vcc, when the beam current reaches a level sufficient for imagetaking. Thus the solenoid 1Mg shown in FIG. 11 is energized to open the shutter 115.

FIG. 13 shows another embodiment of the detecting circuit for identifying the function state of the imaging tube, utilizing the beam current thereof, wherein the same components as those in FIG. 11 are represented by same numbers. In FIG. 13 there are shown an accelerating electrode 1G2 of the imaging tube 1PT, a cathode 1K a high-voltage generating circuit 1E powered by the power source 1Vcc of the camera circuit and supplying a high voltage to said accelerating electrode 1G2, a resistor 1R27 for converting the beam current into a voltage, a resistor 1R28 connected in series with the heater 1H to the power source, resistors 1R29, 1R30 for providing a reference potential indicating the reference level of the beam current, and a comparator 1IC3 for comparing the potential at said resistor 1R27 with that at the junction between said resistors 1R29 and 1R30.

While the heater 1H is unwarmed immediately after the start of power supply, there appears no beam current so that no potential is given across the resistor 1R27. On the other hand the heater is heated by the current through the resistor 1R28. In this state, as the voltage divided by the resistor 1R29 and 1R30 from the power source voltage 1Vcc and supplied to the negative input terminal of the comparator 1IC3 is higher than the voltage supplied to the positive input terminal thereof from the resistor 1R27, the comparator 1IC3 provides an L-level output substantially equal to the ground level. The beam current reached a level sufficient for image-taking when the heater is warmed after the lapse of a certain time, whereby the resistor 1R27 generates a determined potential higher than the voltage supplied to the negative input terminal of the comparator 1IC3 to obtain therefrom an H-level output substantially equal to the power source voltage 1Vcc.

As a variation to FIG. 11, FIG. 14 shows another embodiment of the detecting circuit utilizing the absence of dark current when the imaging tube has no beam current, wherein the same components as those in FIG. 11 are represented by same numbers. In FIG. 14 there are shown a preamplifier 1Amp for amplifying the image signals from the imaging tube 1PT, a condenser 1C1, a resistor 1R31, a resistor 1R32 connected to the heater 1H of the imaging tube 1PT, and resistors 1R33, 1R34 for providing at the junction therebetween a reference potential for the dark current.

There are further added a comparator 1IC4 for comparing the potential at the junction between the resistor 1R31 and condenser 1C1 with that at the junction between the resistors 1R33, 1R34 a condenser 1C2, a resistor 1R35, and a flip-flop F/F connected at the reset port thereof to the junction between the condenser 1C2 and resistor 1R35 and at the set port S to said comparator 1C14 and supplying an output signal Q for controlling the aforementioned solenoid 1Mg. The above-explained detecting circuit functions in the following manner.

In the absence of beam current during the unwarmed state of the heater 1H, the preamplifier 1Amp provides no output signals as shown in FIG. 15(a). However, when the beam current reaches a determined level after the heating of the heater 1H, there is obtained, in the absence of incident light to the photoelectric face of the imaging tube 1PT, a waveform as shown in FIG. 15(b), through amplification by the preamplifier 1Amp of so-called dark current generated by the beam current in the imaging tube 1PT. The dark curent does not appear in the blanking period 1BLK in which the beam is usually cut off.

Immediately after the start of power supply when the heater 1H is still unwarmed to provide the output as shown in FIG. 15(a) from the preamplifier 1Amp, the negative input terminal of the comparator 1IC4 receives the power source voltage 1Vcc appearing at the junction between the condenser 1C1 and resistor 1R31, which is higher than a voltage 1KVcc obtained by the division of said voltage 1Vcc through the resistors 1R33, 1R34, so that the comparator 1IC4 provides an L-level output substantially equal to the ground level.

The flip-flop F/F, of R-S type releasing an H-level output Q upon receipt of an H-level trigger pulse close to the voltage Vcc at the set port S and an L-level output Q upon receipt of an H-level trigger pulse at the reset port R, is maintained in the reset state with L-level output Q at the start of power supply by a trigger signal supplied from a differentiating circuit composed of the condenser 1C2 and resistor 1R35.

When the beam current reaches a determined level by sufficiently warmed heater after the lapse of a certain time, the preamplifier 1Amp provides, in the aforementioned manner, an output shown in FIG. 15(b) which is supplied, through said circuit of the condenser 1C2 and resistor 1R35, to the negative input terminal of the comparator 1IC4 in a waveform shown in FIG. 15(c), wherein 1KVcc represents the voltage level supplied to the positive input terminal. Consequently the comparator 1IC4 provides an output as shown in FIG. 15(d) in which the H-level and L-level are substantially equal, respectively, to 1Vcc and the ground level.

In this manner the output of the flip-flop 1F/F is maintained at L-level after the start of power supply to the camera and shifted to H-level when the beam current reaches a determined level, said H-level state being naturally maintained until the power supply is again cut off.

As a variation to the circuit shown in FIG. 2, FIG. 16 shown another embodiment of the detecting circuit utilizing indirect detection of the function state of the imaging tube, wherein the same components as those in FIG. 11 are represented by same numbers. In the present embodiment a timer circuit programmed to a given time from the start of power supply to the operative state which is substantially constant for each image tube is activated at the start of power supply, and the shutter is controlled by the output signal from said timer circuit. In FIG. 16 there are shown a resistor 1R36 connected to the heater 1H, a resistor 1R37 and a condenser 1C3 constituting said timer circuit, a diode 1D2 for discharging said condenser 1C3, resistors 1R38, 1R39 for identifying the charged voltage of the condenser 1C3, and a comparator 1IC5 for comparing the voltage across the condenser 1C3 with that obtained by said resistors 1R38, 1R39. The above-explained circuit functions in the following manner.

Upon turning on of the power supply to the camera, circuit, the heater 1H of the imaging tube 1PT is heated by the current supplied through the resistor 1R36, and the condenser 1C3 is charged simultaneously through the resistor 1R37. The negative input terminal of the comparator 1IC5 receives a voltage divided by the resistors 1R38, 1R39 from the power source voltage 1Vcc. Consequently, in the initial period of charging of the condenser 1C3, the comparator 1IC5 receives a higher voltage at the negative input terminal thereof than at the positive input terminal to release an L-level output. Then, after the lapse of a time determined by the condenser 1C3 and resistor 1R37, the voltage at said positive input terminal exceeds that at the negative input terminal to invert said output to H-level. Said time is selected longer than the time required for reaching a determined beam current after the start of heating of the heater H.

As explained in the foregoing, the present invention shields the imaging tube from the incident light by means of a shutter mechanism until the imaging tube reaches a stable function state after the start of power supply to the video camera, thereby preventing the burning phenomenon in the photoelectric face of said tube and thus providing an easily usable video camera.

Now FIG. 17 shows, in a perspective view, an optical system representing another embodiment of the present invention, comprising a focusing lens system 210, a zooming lens system 211 a relay lens system 212, a half mirror 213, a photoreceptor 214, a diaphragm 215 and an imaging tube 216. In the non-operative state, the diaphragm 215 is not powered and is therefore closed. In the normal function, the incident light guided through the focusing lens system 210 and zooming lens system 211 is partly reflected by the half mirror 213 and introduced into the photoreceptor 214, output of which controls the diaphragm 215. The light passing through the half mirror 213 is reduced to an appropriate intensity by the diaphragm 215 and focused by the relay lens system 212 onto a photoelectric face of the imaging tube 216. At the start of function the diaphragm 215 is closed by cutting off the power supply thereto until a stable function state is identified by an appropriate level of the beam current in the imaging tube 216.

The aforementioned function of the optical system is achievable by a control circuit as shown in FIG. 18, wherein a picture tube or imaging tube 2PT corresponds to the tube 216 shown in FIG. 17. In the present embodiment the function state of the imaging tube is identified by the heater current thereof.

For this purpose the heater 2H of the imaging tube 2PT is connected to an unrepresented power source through a resistor 2R21. Resistors 2R22 and 2R23 are serially connected to the unrepresented power source, and provide, at the junction therebetween, a reference potential of identifying the function state of the imaging tube 2PT.

A comparator 2IC1 compares the potential at the junction between said heater 2H and resistor 2R21 with said reference potential and provides the result of said comparison.

A photoreceptor 2CdS, corresponding to the photoreceptor 214 in FIG. 17, is connected to the power source through a resistor 2R24 and provides a potential indicating the light intensity at the junction with said resistor. Resistors 2R25, 2R26 provide a potential indicating a reference light intensity.

A comparator 2IC2 compares the potential at said photoreceptor 2CdS with said reference potential for light intensity and provides an output signal for controlling the diaphragm 2Me, corresponding to 215 in FIG. 17, connected at a terminal thereof to the output terminal of said comparator 2IC1.

A switching element 2Q1 is controlled by the output signal of the aforementioned comparator 2IC1 to connect the other terminal of said diaphragm 2Me to the unrepresented power source.

The above-explained circuit functions in the following manner.

Immediately after the start of power supply from said power source, the heater 2H of the imaging tube 2PT, being still unwarmed shows a sufficiently smaller resistance than that of the resistor 2R21 to provide a lower voltage to the negative input terminal of the comparator 2IC1 than the reference potential at the positive input terminal thereof obtained by division of the power source voltage 2Vcc through the resistors 2R22, 2R23, whereby said comparator 2IC1, provides an L-level output substantially equal to the ground level. When the heater 2H is sufficiently warmed to reach a determined resistance after the lapse of a certain time, the comparator 2IC1 receives a lower voltage at the negative input terminal than at the positive input terminal to release an H-level output substantially equal to the power source voltage 2Vcc. At this point the beam current becomes sufficient for image-taking.

The circuit portion at the right-hand side of the junction 2a, 2b and 2c constitutes an automatic exposure control circuit of so-called external light-measuring type in which the photoreceptor 2CdS is positioned in front of the diaphragm and photoelectric face. In this circuit, for example in response to an increasing luminance of the object, the photoreceptor 2CdS reduces the resistance thereof to increase the voltage supplied to the negative input terminal of the comparator 2IC2, whereby the output signal therefrom to the diaphragm 2Me is decreased to reduce the diaphragm aperture. The diaphragm mechanism employed herein has to be of a structure closing the aperture in the absence of voltage supply and enlarging the aperture in response to the increase in voltage supply. Also the comparator 2IC2 is so structured as to reduce the voltage supplied to the diaphragm 2Me when the voltage divided by the resistor 2R24 and the photoreceptor 2CdS becomes higher than the voltage divided by the resistors 2R25 and 2R26 in response to the light received by said photoreceptor 2CdS, and a resistor 2R27 is provided for determining the sensitivity of the automatic exposure control circuit. In this automatic exposure control circuit the power source voltage 2Vcc is supplied to the comparator 2IC1 through a transistor 2Q1, so that said circuit is rendered operative in the on-state of said transistor 2Q1 but, in the off-state thereof, is not operative to close the diaphragm by cutting off the voltage supply thereto regardless of the light intensity from the object. The detecting circuit for identifying the function state of the imaging tube, positioned at the left-hand side of the junctions 2a, 2b and 2c, provides the detection signal through the junction 2b and a resistor 2R28 to the base of said transistor 2Q1, so that said transistor 2Q1 is turned off by the L-level base potential to forcedly close the diaphragm aperture immediately after the start of power supply to the camera.

Now, as variations to the foregoing embodiment in which the function state of the imaging tube 2PT is identified by a detecting circuit for detecting the heater current, there will be given other embodiments capable of replacing said detecting circuits.

FIG. 19 shows, in a block diagram, another embodiment in which the function state of the imaging tube is identified by the heater resistance, wherein the same components as those in FIG. 18 are represented by the same numbers.

In FIG. 19, a constant current course 2I0, which can be of a know circuit structure, provides a constant current to the heater 2H of the imaging tube 2PT.

Resistors 2R29, 2R30 provide, at the junction therebetween, a potential indicating the resistance of said heater 2H in the normal function state.

A comparator 2IC3 is connected at the positive input terminal thereof to said heater 2H and the negative input terminal to the junction between said resistors 2R29, 2R30. Also the terminals 2a1, 2b1 and 2c1 in FIG. 19 are connected to those 2a, 2b and 2c, respectively, in FIG. 18. The above-explained circuit functions in the following manner.

Immediately after the start of power supply, the heater 2H of the imaging tube 2PT, being still unwarmed, shows a low resistance, whereby the voltage across said heater caused by the constant current from the constant current source 2I0 is smaller than that across the resistor 2R30 obtained by division of the power source voltage 2Vcc through the resistors 2R29, 2R30. Consequently the comparator 2IC3 receives a lower voltage at the positive input terminal than at the negative input terminal to provide an L-level output substantially equal to the ground level. When the heater 2H is sufficiently warmed to reach a determined resistance after the lapse of a certain time, the comparator 2IC3 receives a higher voltage at the positive input terminal than at the negative input terminal to provide an H-level output substantially equal to the power source voltage 2Vcc, when the beam current reaches a level sufficient for image-taking.

In this manner the diaphragm can be controlled by the output signal from the comparator 2IC2 shown in FIG. 18 by means of the connections of the terminals 2a1, 2b1 and 2c1 with the terminals 2a, 2b and 2c, respectively.

FIG. 20 shows another embodiment of the detecting circuit for identifying the function state of the imaging tube, utilizing the beam current thereof, wherein the same components as those in FIG. 18 are represented by same numbers. In FIG. 20 there is shown an accelerating electrode 2G2 of the imaging tube 2PT, and a high-voltage generating circuit 2E powered by the power source 2Vcc of the camera circuit and supplying a high voltage to said accelerating electrode 2G2.

A resistor 2R31 converts the beam current into a voltage. A resistor 2R32 is connected, in series with the heater 2H, to the power source. Resistors 2R33, 2R34 provide a reference potential indicating the reference level of the beam current. A comparator 2IC4 compares the potential at said resistor 2R31 with that at the junction between the resistor 2R33, 2R34.

While the heater 2H is unwarmed immediately after the start of power supply, there appears no beam current so that no potential is given across the resistor 2R31. On the other hand, the heater is heated by the current through the resistor 2R32. In this state, as the voltage divided by the resistors 2R33 and 2R34 from the power source voltage 2Vcc and supplied to the negative input terminal of the comparator 2IC4 is higher than the voltage supplied to the positive input terminal thereof from the resistor 2R31, the comparator 2IC4 provides an L-level output substantially equal to the ground level.

The beam current reaches a level sufficient for image-taking when the heater is warmed after the lapse of a certain time, whereby the resistor 2R31 generates a determined potential higher than the voltage supplied to the negative input terminal of the comparator 2IC4 to obtain therefrom an H-Level output substantially equal to the power source voltage 2Vcc. Thus, by connecting the terminals 2a2, 2b2 and 2c2 to 2a, 2b and 2c, respectively, in FIG. 18, it is rendered possible to turn on the transistor 2Q1 in FIG. 18 and to control the diaphragm 2Me by the output signal from the comparator 2IC2.

As a variation to the detecting circuit shown in FIG. 18, FIG. 21 shows another embodiment of the detecting circuit utilizing the absence of dark current when the imaging tube has no beam current, wherein the same components as those in FIG. 18 are represented by same numbers.

In FIG. 21 there are shown a preamplifier 2Amp for amplifying the image signals from the imaging tube 2PT, a condenser 2C1, a resistor 2R35, a resistor R236 connected to the heater 2H of the imaging tube, and resistors 2R37, 2R38 for providing at the junction therebetween a reference potential for the dark current.

There are further added a comparator 2IC5 for comparing the potential at the junction between the resistor 2R35 and condenser 2C1 with that at the junction between the resistors 2R37, 2R38, a condenser 2C2, a resistor 2R40, and a flip-flop 2F/F connected at the reset port thereof to the junction between the condenser CC2 and resistor 2R39 and at the set port S to said comparator 2IC5 and supplying an output signal Q for controlling the transistor element 2Q1. The above-explained circuit functions in the following manner.

In the absence of beam current during the unwarmed state of the heater 2H, the preamplifier 2Amp provides no output signals as shown in FIG. 22(a). However, when the beam current reaches a determined level after the heating of the heater, there is obtained, in the absence of incident light to the photoelectric face of the imaging tube 2PT, a waveform as shown in FIG. 22(b), through amplification by the preamplifier 2Amp of so-called dark current generated by the beam current in the imaging tube. The dark current does not appear in the blanking period 2BLK in which the beam in usually cut off.

Immediately after the start of power supply when the heater 2H is still unwarmed to provide the output as shown in FIG. 22(a) from the preamplifier 2Amp, the negative input terminal of the comparator 2IC5 receives the power source voltage 2Vcc appearing at the junction between the condenser 2C1 and resistor 2R35, which is higher than a voltage 2KVcc obtained by the division of said voltage 2Vcc through the resistors 2R37, 2R38, so that the comparator 2IC5 releases an L-level output substantially equal to the ground level.

The flip-flop 2F/F, of R-S type releasing an H-level output Q upon receipt of an H-level trigger pulse close to the voltage 2Vcc at the set port S and an L-level output Q upon receipt of an H-level trigger pulse at the reset port R, is maintained in the reset state with L-level output Q at the start of power supply by a trigger signal supplied from a differentiating circuit composed of the condenser 2C2 and resistor 2R39.

When the beam current reaches a determined level by sufficiently warmed heater after the lapse of a certain time, the preamplifier 2Amp provides, in the aforementioned manner, an output shown in FIG. 22(b) which is supplied, through said circuit of the condenser 2C2 and resistor 2R39, to the negative input terminal of the comparator 2IC5 in a waveform shown in FIG. 22(c), wherein 2KVcc represents the voltage level supplied to the positive input terminal. Consequently the comparator 2IC5 provides an output as shown in FIG. 22(d) in which the H-level and L-level are substantially equal, respectively, to 2Vcc and the ground level.

Thus the output of the flip-flop 2F/F is maintained at L-level after the start of power supply to the camera and shifted to H-level when the beam current reaches a determined level, said H-level state being naturally maintained until the power supply is again cut off.

As a variation to the circuit shown in FIG. 18, FIG. 23 shows another embodiment of the detecting circuit utilizing indirect detection of the function state of the imaging tube, wherein the same components as those in FIG. 18 are represented by same numbers. In the present embodiment a timer circuit programmed to a given time from the start of power supply to the operative state which is substantially constant for each imaging tube is activated at the start of power supply, and the transistor 2Q1 is controlled by the output signal from said timer circuit. In FIG. 23 there are shown a resistor 2R40 connected to the heater 2H, a resistor 2R41 and a condenser 2C3 constituting said timer circuit, a diode 2D1 for discharging said condenser 2C3, resistors 2R42, 2R43 for identifying the charged voltage of the condenser 2C3, and a comparator 2IC6 for comparing the voltage across the condenser 2C3 with that obtained by said resistors 2R42, 2R43. The above-explained detecting circuit functions in the following manner.

Upon turning on of the power supply to the camera circuit, the heater 2H of the imaging tube 2PT is heated by the current supplied through the resistor 2R40, and the condenser 2C3 is charged simultaneously through the resistor 2R41. The negative input terminal of the comparator 2IC6 receives a voltage divided by the resistors 2R42, 2R43 from the power source voltage 2Vcc.

Consequently, in the initial period of charging of the condenser 2C3, the comparator 2IC6 receives a higher voltage at the negative input terminal thereof than at the positive input terminal to release an L-level output. Then, after the lapse of a time determined by the condenser 2C3 and resistor 2R41, the voltage at said positive input terminal exceeds that at the negative input terminal to invert said output to H-level. Said time is selected longer than the time required for reaching a determined beam current after the start of heating of the heater H.

Now FIG. 24 shown, in a perspective view, another optical system, embodying the present invention, comprising a focusing lens system 220, a zooming lens system 221, a relay lens system 222, a diaphragm 223 and an imaging tube 224. In its non-operative state, the diaphragm 223 is closed to shield the imaging tube 224 from the incident light. In its operative condition, the incident light guided through the focusing lens system 220, zooming lens system 221 and diaphragm 223 is focused by the relay lens system 222 onto a photoelectric face of the imaging tube 224. An appropriate light amount is obtained by feedback control of said diaphragm 223 by the output signal from said imaging tube 224. At the start of function the diaphragm 223 is maintained closed by the control circuit therefor until the beam current of the imaging tube 224 reaches an appropriate level for stable function.

The aforementioned function of the optical system is achievable by a control circuit as shown in FIG. 25, wherein a picture tube or imaging tube 2PT1 corresponds to the tube 224 shown in FIG. 224. In the present embodiment the function state of the imaging tube is identified by the heater current thereof.

For this purpose the heater 2H of the imaging tube 2PT1 is connected to an unrepresented power source through a resistor 2R44. Resistors 2R45 and 2R46 are serially connected to the unrepresented power source, and provide, at the junction therebetween, a reference potential for identifying the function state of the imaging tube 2PT1.

A comparator 2IC7 compares the potential at the junction between said heater 2H and resistor 2R44 with said reference potential and provides the result of said comparison.

There are also shown an amplifier 2Amp1 for amplifying the image signals from the imaging tube; a diode 2D2 for rectifying the image signals; a condenser 2C4 and a resistor 2R47 which convert in combination with said diode 2D2 the image signals into DC signals; a resistor 2R48 connected to the output terminal of said diode; resistors 2R49, 2R50 for providing a reference voltage as will be explained later; a comparator 2IC8 for comparing the image signals supplied through the resistor 2R48 with the reference signal obtained from the resistors 2R49, 2R50 and providing an inverted output signal; a resistor 2R51 for determining the feedback level; a diaphragm 2Me corresponding to 223 in FIG. 24; a switching element 2Q2 controlled by the output signal from said comparator 2IC7 to connect said diaphragm 2Me to the ground; and a resistor 2R52. The above-explained circuit functions in the following manner.

The circuit portion present at the left-hand side of the junctions 2a', 2b' and 2c' constitutes a detecting circuit of which function was already explained in connection with FIG. 18. The circuit portion present at the right-hand side of said junctions 2a', 2b' and 2c' constitutes an automatic exposure control circuit so designed as to maintain the image signals supplied from the imaging tube 2PT1 and amplified by the preamplifier 2Amp1 at a constant level. More specifically, the image signals are supplied, after DC conversion by the diode 2D1, condenser 2C4 and resistor 2R47, to an inverting amplifier composed of the comparator 2IC8 and resistors 2R49, 2R50, 2R51. Thus, in response to a larger amplitude of the image signal corresponding to a higher luminance of the object, a larger DC voltage is applied to the comparator 2IC8 to obtain a lower output voltage therefrom, thus reducing the diaphragm aperture. The diaphragm mechanism employed in the present embodiment has to be of a structure adapted for closing the diaphragm aperture in the absence of voltage supply and enlarging the aperture according to the voltage supplied. In this manner the imaging tube 2PT1 provides a lower output voltage, and an equilibrium is reached when the voltage to the negative input terminal of the comparator 2IC8 becomes substantially equal to the voltage divided by the resistors 2R49, 2R50 and supplied to the positive input terminal thereof. In this manner the automatic exposure control is achieved by the function of the automatic exposure control circuit in the off-state of the transistor 2Q2, but when the transistor is turned on, the potential at the junction 2g is clamped substantially to 2Vcc, thus increasing the input voltage to the comparator 2IC8 and completely closing the diaphragm aperture. Thus the detecting circuit for identifying the function state of the imaging tube, positioned at the left-hand side of the junctions 2a', 2b' and 2c', provides the detection signal through the junction 2b' and a resistor 2R52 to the base of transistor 2Q2, to turn on said element by the L-level base potential after the start of power supply to the camera, thus forcedly closing the diaphragm 2Me. The aforementioned detecting circuit at the left-hand side of junctions 2a', 2b' and 2c' FIG. 25 can be modified in a similar manner as in FIGS. 19, 20, 21, and 23, explained as variations to the embodiment shown in FIG. 18.

As a variation to the circuit shown in FIG. 25, FIG. 26 shows another embodiment in which the same components as those in FIG. 25 are represented by same numbers.

In the present embodiment, the detecting circuit for the imaging tube 2PT1 positioned at the left-hand side of the junctions 2a", 2b" and 2c" is same as that shown in FIG. 25. Also the automatic exposure control circuit positioned at the right-hand side of said junctions is substantially same as that shown in FIG. 25, except that the power supply to said circuit is conducted by the transistor 2Q2 controlled by the output signal from the comparator 2IC7. The present embodiment functions in the following manner.

The automatic exposure control circuit, positioned at the right-hand side of the junctions 2a", 2b" and 2c", is designed to maintain the image signals obtained from the imaging tube 2PT1 and amplified by the preamplifier 2Amp1 at a constant level. More specifically, the image signals are supplied, after DC conversion by the diode 2D2, condenser 2C4 and resistor 2R47, to an inverting amplifier composed on the comparator 2IC8 and resistors 2R49, 2R50 and 2R51. Thus, in response to a larger amplitude of the image signal corresponding to a higher luminance of the object, a larger DC voltage is applied to the comparator 2IC8 to obtain a lower output voltage therefrom, thus reducing the diaphragm aperture. The diaphragm mechanism employed in the present embodiment has to be of a structure adapted for closing the diaphragm aperture in the absence of voltage supply and enlarging the aperture according to the voltage supplied. In this manner the imaging tube provides a lower output voltage, and an equilibrium is reached when the input voltage to the negative input terminal of the comparator 2IC8 becomes substantially equal to the voltage divided by the resistors 2R49, 2R50 and supplied to the positive input terminal thereof, thus achieving automatic exposure control. However, as the power supply to the automatic exposure control circuit is conducted through the transistor 2Q2, said circuit is rendered operative in the on-state of said transistor 2Q2 but is rendered non-operative in the off-state thereof to maintain the diaphragm 2Me2 forcedly closed regardless of the light intensity from the object. Thus, the detecting circuit for identifying the function state of the imaging tube, positioned at the left-hand side of the junctions 2a", 2b" and 2c", provides the detection signal through the junction 2b" and a resistor 2R52 to the base of said transistor 2Q2 to turn off the same immediately after the start of power supply to the camera, thus forcedly closing the diaphragm 2Me2.

The above-mentioned detecting circuit, positioned at the left-hand side of the junctions 2a", 2b" and 2c", which is same as the detecting circuit shown in FIG. 18 and utilizing the detection of heater current, can also be replaced by the various detecting circuits as shown in FIGS. 19, 20, 21 and 23 for achieving the diaphragm closing immediately after the start of power supply to the camera.

As explained in detail in the foregoing, the present invention is adapted to interrupt the power supply to the automatic exposure control circuit to close the diaphragm aperture by detecting a period for (1) heater current, (2) heater voltage, (3) beam current or (4) dark current to reach a stable level after the start of power supply or for a period determined by a timer, thereby preventing the burning phenomenon of photoelectric face even in the presence of a high-luminance incident light and to provide an extremely, easily useable video camera.

What we claim is:
1. A video camera, comprising:
an imaging pick up tube for picking up object images, including a light receiving face plate and a heater;
detecting means for detecting an initially operative condition of said imaging tube;
interrupting means for interrupting an incident light irradiating to said light receiving face plate;
power supply means for supplying power to said heater; and control means associated with said power supply means for causing said interrupting means to operate when the application of power by said power supply means is interrupted, and for releasing the operation of said interrupting means in response to detecting output from said detecting means after the application of power by said power supply means.

2. A video camera according to the claim 1, wherein said interrupting means includes a diaphragm forming an aperture, and said control means maintains said aperture of said diaphragm at a closed condition until said detecting means outputs the detecting output.

3. A video camera according to the claim 2, further comprising automatic aperture control means for controlling said aperture of said diaphragm in response to the intensity of the incident light.

4. A video camera according to the claim 3, wherein said automatic aperture control means controls said aperture of said diaphragm in response to an output video signal from said imaging tube.

5. A video camera according to the claim 3, further comprising light detecting means, different from said detecting means of said image tube, for detecting luminance of an object, and said automatic aperture control means for controlling said aperture of said diaphragm in accordance with an output of said light detecting means.

6. A video camera according to the claim 3, further comprising power supply means for supplying said automatic aperture control means with power, said power supply means being prohibited from supplying power until the detecting output of said detecting means is obtained.

7. A video camera according to claim 1, wherein said interrupting means includes a shutter for intercepting an incident light into said imaging tube.

8. A video camera according to the claim 1, wherein said interrupting means includes a memory member for storing the detecting output obtained from said detecting means.

9. A video camera according to the claim 8, wherein said memory member holds the detecting output from said detecting means until the application of power by said power supply means to the heater of said imaging tube is shut off.

10. A video camera according to the claim 1, wherein said detecting means includes circuit means for detecting a current function state of said imaging tube.

11. A video camera according to the claim 10, wherein said circuit means detects the resistance of the heater.

12. A video camera according to the claim 10, wherein said circuit means detects the lapse of a predetermined time from the start of application of power of said power supply means.

13. A video camera according to the claim 10, wherein said imaging tube includes a cathode, and said circuit means detects the current in the cathode.

14. A video camera according to the claim 1, wherein said detecting means detects a beam current in said imaging tube.

15. A video camera according to claim 1, wherein said detecting means detects a dark current of said imaging tube.

16. A video camera according to claim 1, wherein said interrupting means prevents all of the light from an object from entering into said imaging tube.

17. A video camera, comprising:
an imaging pick up tube for picking up object images, including a light receiving face plate and a heater;
a diaphragm for controlling light intensity irradiating to said imaging tube and forming an aperture;
automatic aperture control means for controlling said aperture of said diaphragm in response to an output of said imaging tube;
detecting means for detecting an operative state of said imaging tube;
power supply means for supplying electric power to said heater; and
disabling means for disabling said automatic aperture control means until the detecting output of said detecting means is obtained after application of power by said power supply means, and for maintaining said aperture of said diaphragm closed when said automatic aperture control means is disabled.

18. A video camera according to the claim 17, wherein said detecting means detects that a heater current of said imaging tube reaches a predetermined value.

19. A video camera according to the claim 17, wherein said detecting means detects a lapse of a predetermined time from the start of the power supply by said power supply means.

20. A video camera according to the claim 17, wherein said detecting means detects that a heater resistance reaches a predetermined value.

21. A video camera according to the claim 17, wherein said detecting means detects that a beam current of said imaging tube reaches a predetermined value.

22. A video camera according to the claim 17, wherein said detecting means detects that a dark current of said imaging tube reaches a predetermined value.

* * * * *